United States Patent [19]

Chang

[11] Patent Number: 5,920,724
[45] Date of Patent: Jul. 6, 1999

[54] SOFTWARE PIPELINING A HYPERBLOCK LOOP

[75] Inventor: Pohua Chang, Saratoga, Calif.

[73] Assignee: Intel Corporation, Santa Clara, Calif.

[21] Appl. No.: 08/630,858

[22] Filed: Mar. 28, 1996

[51] Int. Cl.$^6$ .................................................. G06F 9/45
[52] U.S. Cl. ........................................ 395/709; 395/588
[58] Field of Search .................................. 395/705, 706, 395/709, 392, 395, 588

[56] References Cited

U.S. PATENT DOCUMENTS

| | | | |
|---|---|---|---|
| 5,265,253 | 11/1993 | Yamada | 395/700 |
| 5,303,357 | 4/1994 | Inoue et al. | 395/375 |
| 5,317,743 | 5/1994 | Imai et al. | 395/700 |
| 5,367,651 | 11/1994 | Smith et al. | 395/700 |
| 5,375,238 | 12/1994 | Ooi | 395/700 |
| 5,386,562 | 1/1995 | Jain et al. | 395/650 |

OTHER PUBLICATIONS

Alexander Aiken & Alexandru Nicolau, "Optimal Loop Parallelization", Proceedings of the SIGPLAN '88 Conference on Programming Language Design and Implementation, SIGPLAN Notices, vol. 23, No. 7, Jul. 1988, pp. 308–317.

David Bernstein, Doron Cohen, & Hugo Krawczyk, "Code Duplication: An Assist for Global Instruction Scheduling", MICRO 24: Proceedings of the 24th Annual International Symposium on Microarchitecture, Nov. 1991, pp. 103–113.

David Bernstein, Doron Cohen, Yuval Lavon, & Vladimir Rainish, "Performance Evaluation of Instruction Scheduling on the IBM RISC System/6000", MICRO 25: Proceedings of the 25th Annual International Symposium on Microarchitecture, Dec. 1992, pp. 226–235.

David Bernstein & Yuval Lavon, "A Software Pipelining Algorithm Based on Global Instruction Scheduling", Technical Report 88.338, IBM Israel, Science and Technology, Sep. 1993, pp. 1–18.

David Bernstein & Michael Rodeh, "Global Instruction Scheduling for Superscalar Machines", Proceedings of the ACM SIGPLAN '91 Conference on Programming Language Design and Implementation, SIGPLAN Notices, vol. 26, No. 6, Jun. 1991, pp. 241–255.

James C. Dehnert, Peter Y.-T. Hsu & Joseph P. Bratt, "Overlapped Loop Support in the Cydra 5", ASPLOS–III Proceedings of the 3rd International Conference on Architectural Support for Programming Languages and Operating Systems, Apr. 1989, pp. 26–38.

Kemal Ebcioğlu, "A Compilation Technique for Software Pipelining of Loops with Conditional Jumps", MICRO 20: Proceedings of the 20th Annual Workshop on Microprogramming, Dec. 1987, pp. 69–79.

(List continued on next page.)

*Primary Examiner*—Emanuel Todd Voeltz
*Assistant Examiner*—Kakali Chaki
*Attorney, Agent, or Firm*—Blakely, Sokoloff, Taylor & Zafman

[57] ABSTRACT

An iterative software pipelining method promotes instructions of a program loop to previous loop iterations and then reschedules the instructions until either 1) the resultant schedule is optimal (i.e., the initiation interval is equal to the minimal initiation interval) or 2) the resultant schedule is not an improvement over the previous schedule generated. The method is applicable to a sequence of instructions within a program loop having a single control flow entry and one or more control flow exit points. First, a minimum initiation interval of the program loop is computed. Second, instruction level parallelism transformations are applied on the program loop. Third, a single iteration schedule is determined for the program loop. Fourth, selected instructions are percolated to a prior iteration of the program loop to generate a new instruction order for the program loop. Each of steps two through four is performed as long as a previous length of the program loop exceeds a single iteration schedule length and the single iteration schedule length exceeds the minimum initiation interval.

18 Claims, 3 Drawing Sheets

OTHER PUBLICATIONS

Alexandre E. Eichenberger, Edward S. Davidson, & Santosh G. Abraham, "Minimum Register Requirements for a Modulo Schedule", MICRO 27: Proceedings of the 27th Annual International Symposium on Microarchitecture, 1994, pp. 75–84.

Rajiv Gupta & Mary Lou Soffa, "Region Scheduling: An Approach for Detecting and Redistributing Parallelism", *IEEE Transactions on Software Engineering*, vol. 16, No. 4, Apr. 1990, pp. 421–431.

Mike Johnson, *Superscalar Microprocessor Design*, Prentice–Hall, Inc., Englewood Cliffs, N.J., 1991, pp. 9–28, 177–199, & 203–235.

Monica Lam, "Software Pipelining: An Effective Scheduling Technique for VLIW Machines", Proceedings of the SIGPLAN '88 Conference on Programming Language Design and Implementation, SIGPLAN Notices, vol. 23, No. 7, Jul. 1988, pp. 318–328.

Soo–Mook Moon & Kemal Ebcioğlu, "An Efficient Resource–Constrained Global Scheduling Technique for Superscalar and VLIW Processors", MICRO 25: Proceedings of the 25th Annual International Symposium on Microarchitecture, Dec. 1992, pp. 55–71.

Qi Ning & Guang R. Gao, "A Novel Framework of Register Allocation for Software Pipelining", Conference Record of the 20th Annual ACM SIGPLAN—SIGACT Symposium on Principles of Programming Languages, Jan. 1993, pp. 29–42.

B.R. Rau & C.D. Glaeser, "Some Scheduling Techniques and An Easily Schedulable Horizontal Architecture for High Performance Scientific Computing", MICRO 14: Proceedings of the 14th Annual Microprogramming Workshop, Oct. 1981, pp. 183–198.

B.R. Rau, M. Lee, P.P. Tirumalai, & M.S. Schlansker, "Register Allocation for Software Pipelined Loops", Proceedings of the ACM SIGPLAN '92 Conference on Programming Language and Design and Implementation, SIGPLAN Notices, vol. 27, No. 7, Jul. 1992, pp. 283–299.

P. Atirumalai, M. Lee & M. Schlansker, "Parallelization of Loops with Exits on Pipelined Architectures", Proceedings of the Supercomputing '90, Nov. 1990, pp. 200–212.

Roy F. Touzeau, "A Fortran Compiler for the FPS—164 Scientific Computer", Proceedings of the ACM SIGPLAN '84 Symposium on Compiler Construction, SIGPLAN Notices, vol. 19, No. 6, Jun. 1984, pp. 48–57.

Nancy J. Warter, Grant E. Haab, Krishna Subramanian, & John W. Bockhaus, "Enhanced Modulo Scheduling for Loops with Conditional Branches", MICRO 25: Proceedings of the 25th Annual International Symposium on Microarchitecture, Dec. 1992, pp. 170–179.

"Parallelization of WHILE Loops on Pipelined Architectures", Tirumalai et al., Journal of SuperComputing, 1991, pp. 119–136.

"Non–unimodular Transformations of Nested Loops", Ramanujam, SuperComputing 1992, pp. 214–223.

"Code Generation Schema for Modulo Scheduled Loops", Rau et al., 1992, pp. 158–169.

"Compiler Code Transformation for Superscalar–Based High–Performance Systems", Mahlke et al., Supercomputing 1992, pp. 808–817.

SOFTWARE PIPELINING A HYPERBLOCK LOOP

FIELD OF THE INVENTION

This invention relates to software pipelining of instructions for subsequent execution on a processor. In particular, this invention relates to software pipelining of a sequence of instructions that has a single control flow entry and one or more control flow exits.

BACKGROUND OF THE INVENTION

A number of hardware and software techniques may be used to improve the execution speed of a software program. The time required to execute the program is dependent upon a number of factors including the number of instructions required to execute the program, the average number of processor cycles required to execute an instruction, and the processor cycle time.

Software scheduling of instructions can be used to enhance the program execution rate. This may be accomplished by using software to reorder the instructions so that they can be executed more efficiently. In other words, software scheduling helps to select the order of a sequence of instructions so that they execute correctly in a minimum amount of time within the constraints of the processor resource limitations.

One prior art software scheduling technique is known as basic block scheduling. Typically the program instructions are divided into code or instruction sequences called basic blocks. A program may consist of any number of basic blocks. A basic block has the property that if any instruction in the block is executed, then all other instructions within the basic block are executed. Thus, only the first instruction in the basic block can be a branch target or entry point. Similarly, only the last instruction in the basic block can be a branch instruction. This ensures that if any instruction in the code sequence is executed, then all instructions within the code sequence are executed. The technique of scheduling instructions or reordering the instructions within a basic block for optimal execution efficiency is called block scheduling.

The prior art technique of block scheduling suffers from the disadvantage that code optimization for each basic block may not result in overall optimal code. Basic block scheduling does not permit instructions to be moved across block boundaries such as branches. Thus although the execution time of each block may be nearly optimal, the overall program execution speed may not be optimal because the processor must hesitate at each branch (i.e., a basic block boundary) until all instructions preceding and including the branch are in execution.

Another class of prior art software scheduling techniques is specifically designed to improved the execution speed of program loops. A program loop is a sequence of instructions in which the last instruction is a branch instruction that may branch to the first instruction in the sequence under certain conditions. Thus the program loop might execute iteratively until some certain condition is met. Software pipelining is a technique used to improve processor throughput of a program loop.

Software pipelining effectively hides instruction latencies in a pipelined processor by overlapping the execution of different loop iterations of a loop structure in the program code. In other words, before one loop iteration completes, execution of successive iterations of the loop is initiated. The initiation interval is the number of processor cycles between the initiation of a given iteration and the initiation of the next iteration.

One disadvantage of prior art software pipelining techniques is that they are effective only for simple loop structures. In particular, some prior art software scheduling techniques are applicable only to a simple loop structure consisting of one basic block. Thus some prior art software pipelining methods are unable to handle more complicated loop structures such as nested loop structures or loops having more than one basic block.

Another disadvantage of some prior art software pipelining methods is that they only work for special hardware or for a narrow class of program loops.

What is needed is a software scheduling technique such as a software pipelining that is applicable to a broader class of instruction sequences including instruction sequences having one or more basic blocks. In particular, a method of software pipelining a sequence of instructions that have a single control flow entry and one or more control flow exits (i.e., a hyperblock program loop) is needed.

SUMMARY AND OBJECTS OF THE INVENTION

An iterative software pipelining method promotes instructions of a program loop to previous loop iterations and then reschedules the instructions until either 1) the resultant schedule is optimal (i.e., the initiation interval is equal to the minimal initiation interval) or 2) the resultant schedule is not an improvement over the previous schedule generated. The method is applicable to a sequence of instructions within a program loop having a single control flow entry and one or more control flow exit points (i.e., a hyperblock loop).

First, a minimum initiation interval of the program loop is computed. Second, instruction level parallelism transformations are applied on the program loop. Third, a single iteration schedule is determined for the program loop. Fourth, selected instructions are percolated to a prior iteration of the program loop to generate a new instruction order for the program loop. Each of steps two through four is performed as long as a previous length of the program loop exceeds a single iteration schedule length and the single iteration schedule length exceeds the minimum initiation interval.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Hardware pipelining and software pipelining are different approaches to improving the execution performance of a processor with respect to a sequence of instructions.

Although similarly named, software pipelining uses software to reorder the sequence of instructions within a program loop in order that the next iteration of the program loop can be executed as soon as possible.

Processor performance can generally be increased by hardware pipelining of the instructions to be executed. Instruction execution generally requires 1) fetching the instruction; 2) decoding the instruction and assembling operands; and 3) executing the instruction and writing the results. To pipeline instruction execution, the various steps of instruction execution are performed by independent units called pipeline stages. The steps of different instructions are executed independently in different pipeline stages. Thus while one instruction can be fetched while another instruction is being decoded. The result of each pipeline stage is communicated to the next pipeline stage. Hardware pipelining does not reduce the total amount of time to execute a given instruction. Hardware pipelining is able to improve processor performance by reducing the average number of processor cycles required to process an instruction (i.e., pipelining increases processor performance by increasing the number of instructions handled at one time).

For example, consider a scalar processor. A scalar processor only executes one instruction at a time. Although some instructions may take more than one cycle to complete, the use of hardware pipelining in a scalar processor may theoretically be able to achieve an average execution rate of one instruction per machine cycle (e.g., in a Reduced Instruction Set Computer (i.e., RISC) architecture). Hardware pipelining permits concurrent execution of instructions in different pipeline stages to achieve this result. Alternatively, a superscalar processor is able to reduce the average number of cycles per instruction by permitting concurrent execution of instructions in the same pipeline stage as well as concurrent execution of instructions in different pipeline stages.

Thus hardware pipelining focuses on improving the processor while software pipelining focuses on optimizing a given application to be executed on the processor. Therefore software pipelining techniques can typically be use to help improve the performance of hardware pipelined processors regardless of whether such processors are scalar or superscalar processors and regardless of the processor architecture (e.g., RISC, Complex Instruction Set Computer (CISC), Very Long Instruction Word (VLIW) computer, etc.)

Figure 1:
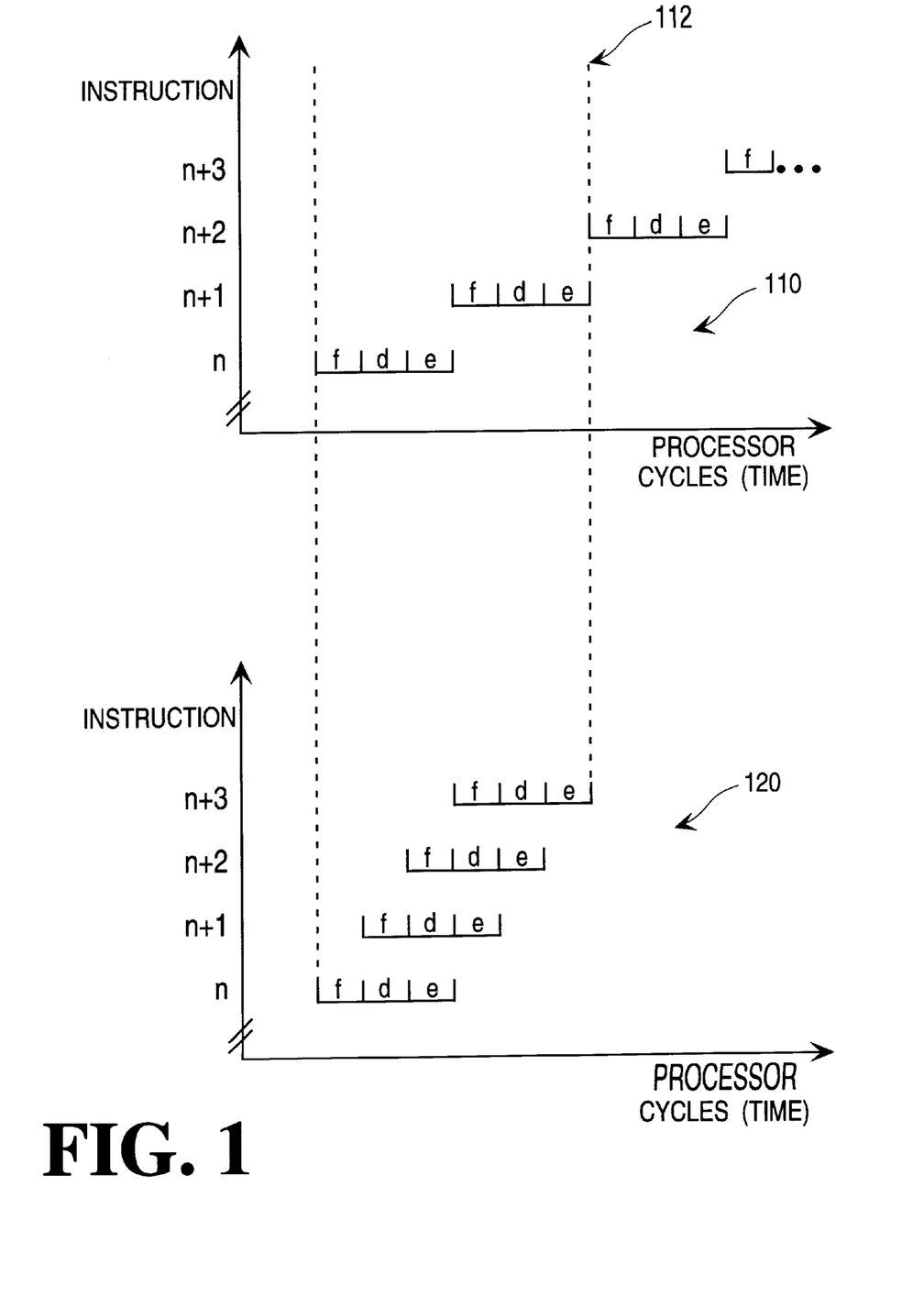
FIG. 1 contrasts instruction handling by a processor with and without hardware pipelining.

FIG. 1 illustrates timing guidelines which contrast instruction handling for a scalar processor without hardware pipelining (110) and a scalar processor with hardware pipelining (120). From timing diagram 110, if the scalar processor without hardware pipelining is working on instruction n, the processor cannot handle the next instruction until instruction n is executed. Thus the time required to fetch, decode, and execute a subsequent instruction must be stacked end-to-end on the time required to fetch, decode, and execute the nth instruction.

The scalar processor with hardware pipelining (120) can handle more than one instruction. In a three stage pipeline, this permits the fetching of instruction n+1 while instruction n is decoding. While the third stage of the pipeline is executing instruction n, the second stage of the pipeline can be decoding instruction n+1, and the first stage of the pipeline can be fetching instruction n+2. In the example provided in FIG. 1, the scalar pipelined processor has completed execution of instruction n+3 at time 112 while the scalar processor without hardware pipelining is only beginning to process instruction n+2. Thus instruction latencies are effectively "hidden" or reduced by overlapping the fetching, decoding, and execution steps of different instructions.

Software pipelining helps to hide instruction latencies in a pipelined processor by overlapping the execution of different loop iterations of a loop structure in the program code. In other words, before one loop iteration completes, execution of successive iterations of the loop is initiated. The initiation interval is the number of processor cycles between the initiation of a given iteration and the initiation of the next iteration. Software pipelining seeks to minimize the initiation interval in order to accelerate the overall execution of the program loop. Software pipelining achieves this by reordering the instructions within the program loop.

Block scheduling of a program loop attempts to minimize the execution time of a single iteration of the program loop. Theoretically, this might seem to produce minimum execution time for the program loop. Theoretically, because of the repetitive nature of the program loop structure, small performance improvements in each execution of the loop can be aggregated into greater performance gains. In other words, the small performance gain is reaped for each iteration of the loop. In practice, however, such scheduling does not account for latencies or delays incurred between the initiation of subsequent iterations of the program loop (i.e., the initiation interval). For example, in order to minimize the single iteration execution time of a program loop containing a single basic block, resources needed for a subsequent iteration of such a program loop might be assigned by the software scheduler. This tends to increase the initiation interval between program loop iterations and therefore results in increased execution time for the program loop. Thus basic block scheduling tends to be in conflict with the goals of minimizing the initiation interval of a program loop.

Figure 2:
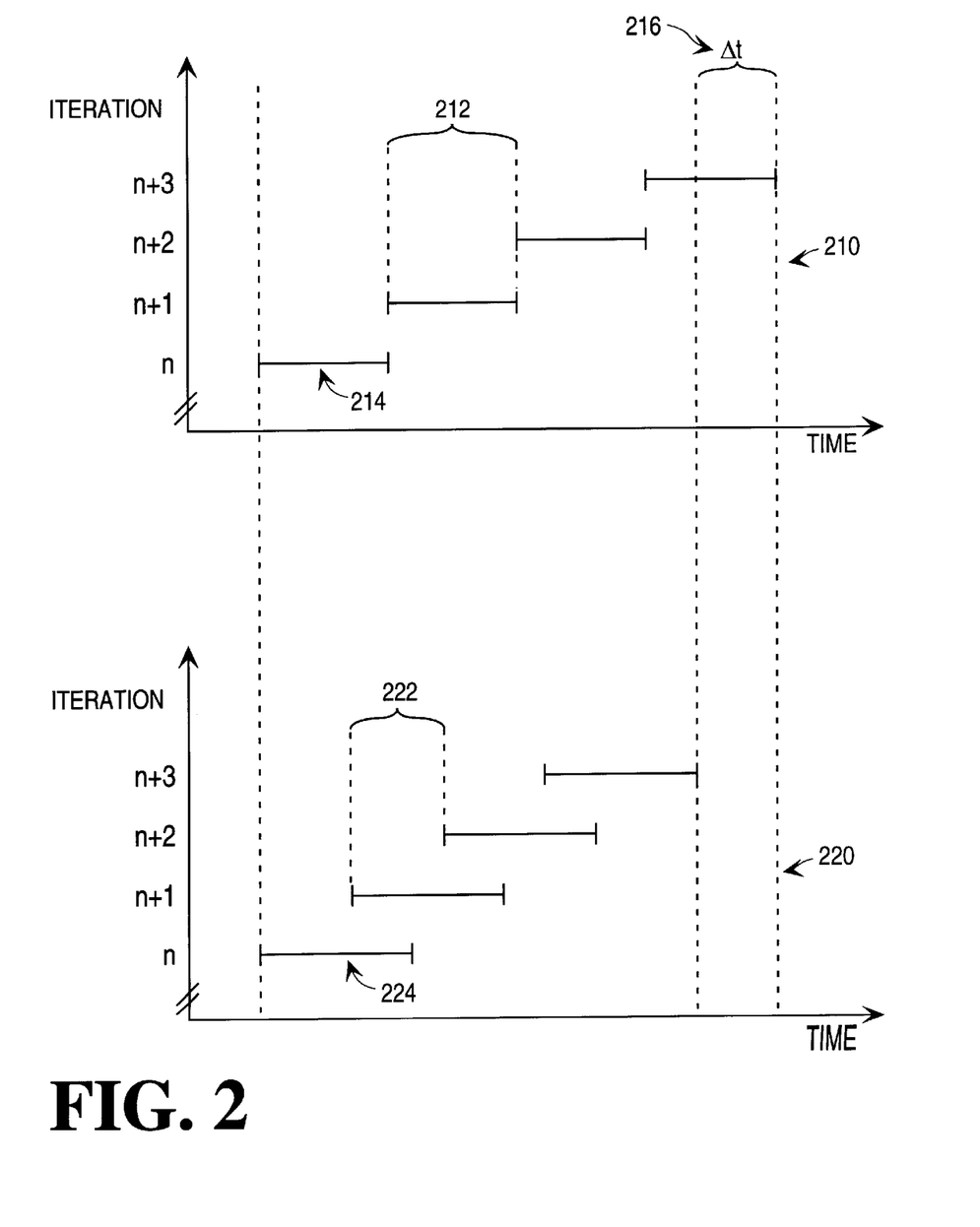
FIG. 2 contrasts scheduling for a minimum iteration time with scheduling for a minimum iteration interval.

FIG. 2 contrasts the processor throughput for a program loop that has been optimized with block scheduling (210) and with software pipelining (220). The block scheduler minimizes the single iteration length of the program loop. Thus the single iteration length, 214, of the block scheduled program loop is less than the single iteration length, 224, of the software pipelined program loop. The n+1 iteration of the block scheduled program loop cannot begin until iteration n is complete so that the time required to complete each iteration must be stacked end-to-end. The minimum initiation interval, 212, in the block scheduled code is greater than the minimum initiation interval, 222, in the software pipelined code. Thus iteration n+1 of the software pipelined program loop can begin before iteration n has completed so that the single iteration length, 224, is overlapped on each iteration. This results in a reduced total execution time for the program loop as illustrated by Δt, 216.

Consider the following instruction sequence for software pipelining:

| L10: | | |
|---|---|---|
| r1 <− memory[r0]; | cycle 1 | (3 cycle load latency) |
| r2 <− r2 + r1; | cycle 3 | (floating point add latency of 3 cycles) |
| r0 <− r0 + 8; | cycle 2 | |
| branch to L10 if (r0 < r3); | cycle 3 | |

Each iteration of this program loop requires 6 cycles in an in-order execution machine. Using software scheduling to reorder the instructions permits the first instruction to be moved to a previous iteration:

```
L10:
    r2 <- r2 + r1;              cycle 1     I1
    r0 <- r0 + 8;               cycle 1     I1
    r1 <- memory[r0];           cycle 2     I2
    branch to L10 if (r0 < r3); cycle 2
```

This reordering results in 4 cycles required for each iteration of the program loop in an in-order execution machine.

Reordering of the instructions can introduce data dependencies, procedural dependencies, and resource conflicts that are counterproductive to software scheduling in that they effectively operate to reduce the execution throughput of processor.

Dependencies operate to decrease the instruction level parallelism of the program loop. Instruction level parallelism is a measure of the average number of instructions that a superscalar processor might be able to execute at the same time. Machine parallelism is a measure of the ability of the processor to take advantage of the instruction level parallelism. A superscalar processor must have sufficient machine parallelism to take advantage of the instruction level parallelism. Procedural, resource, and data dependencies limit the instruction level parallelism of instruction sequences as described below. Instruction level parallelism transformations might be used to decrease these dependencies in order to increase the instruction level parallelism of the program loop.

A procedural dependency results when a processor cannot determine which set of instructions to execute until a branch instruction is executed. In other words, instructions following the branch instruction may or may not be executed depending upon the branch condition. Thus these instruction may not be executed until the branch instruction is executed. Furthermore, execution of a given instruction has a procedural dependency on each branch executed up until that point.

A resource conflict arises when two instructions must use the same resource (e.g., a register) at the same time. Resource conflicts can typically be resolved by delaying execution of one of the instructions until the resource is available or duplicating the resource.

Data dependencies can be further classified as true dependencies, antidependencies, and output dependencies. Although often collectively referred to as simply data dependencies, the distinction between the classifications is important for purpose of applying instruction level parallelism transformations.

True data dependency (also called flow dependency or write-read dependency) results when the result of the execution of a first instruction is needed for the execution of second instruction. Thus the second instruction is data dependent upon the first instruction. Typically, the execution of the second instruction must be delayed until all of its input values are available.

Antidependencies are often referred to as read-write dependencies. An antidependency results when a second instruction destroys a value used by a first instruction. Thus instructions subsequent to the first and second instructions must be delayed until the first instruction execution is completed and the second instruction execution has begun. Although both true data dependency and antidependency are manifested through storage locations, true data dependencies represent the flow of data and information through the program. True data dependencies cannot be removed. Antidependencies arise, however, because at different points in time storage locations hold different values for different computations. Antidependencies thus directly result from storage conflicts (hence sometimes antidependencies are grouped with resource conflicts). Typically instruction level parallelism transformations can be used to remove antidependencies. For example, antidependencies can be removed by duplicating the storage resource through register renaming.

Output dependencies are often also referred to as write-write dependencies. Similar to antidependencies, an output dependency results from storage conflicts because at different points in time, the storage locations hold different values for different computations. As with antidependencies, output dependencies can be removed through instruction level parallelism transformations such as register renaming.

In order to overcome many of the dependencies stated above, software scheduling can use dependence breaking transformations to the instructions in the program loop. These dependence breaking transformations are also referred to as instruction level parallelism (ILP) optimizations or transformations because the effect of the transformation is to make more instructions available for concurrent execution. The software scheduler then schedules the instructions. The software scheduler improves the program loop from an execution standpoint by selecting instructions to be promoted (or "percolated") to the previous iteration. This results in a new execution order for the instructions in the program loop.

The software pipelining algorithm presented here is an iterative method that continually improves the code schedule of a program loop until no further improvement can be made. This is accomplished by applying dependence breaking transformations to the instructions within the body of the program loop. After the dependence breaking transformations have been applied, the code schedule is improved by selecting instructions to be promoted to the previous iteration of the loop thus resulting in a new ordering for the instructions within the body of the hyperblock loop. The dependence breaking transformations are then applied to the new ordering of instructions to generate a new code schedule.

Figure 3:
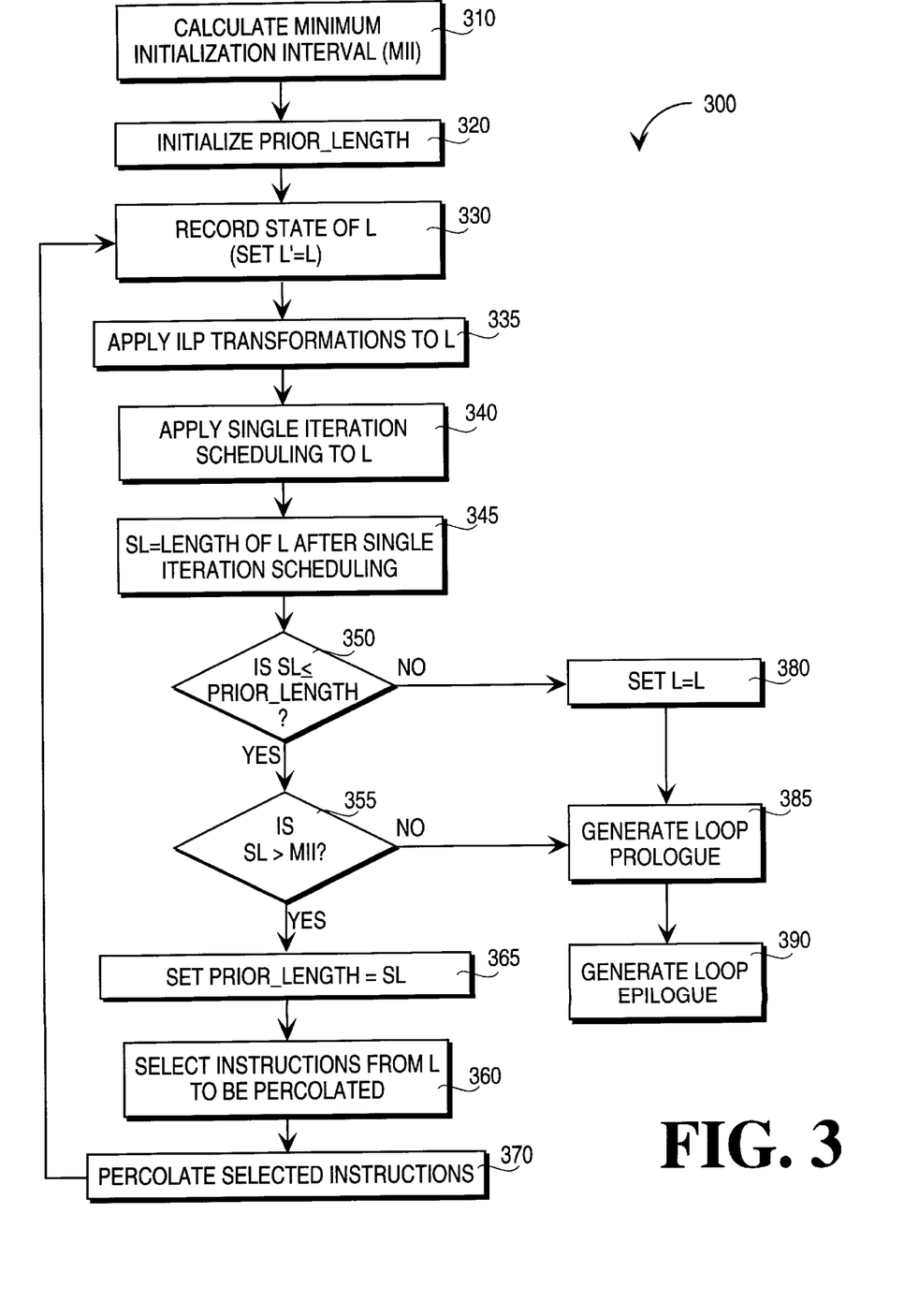
FIG. 3 illustrates a flowchart for one embodiment of the software pipelining method.

The iterative software pipelining method continues to promote instructions to previous loop iterations and then reschedules them until either 1) the resultant schedule is optimal (i.e., the initiation interval is equal to the minimal initiation interval) or 2) the resultant schedule is not an improvement over the previous schedule generated. This algorithm is applicable to program loops consisting of one or more basic blocks. In other words, the algorithm may be applied to a sequence of instructions that have a single control flow entry and one or more control flow exits (i.e., a hyperblock loop). A "pseudo-C" representation of one embodiment of the software pipelining method is presented in Appendix I. FIG. 3 illustrates a flowchart of one embodiment of the iterative software pipelining method described below.

Initialization

In step 310, the minimum initiation interval (MII) is calculated. This serves as the lower bound goal for the software pipelining method. The software pipelining method will attempt to reschedule instructions until the initiation interval of the program loop is equal to MII. This goal may not be achievable depending upon constraints due to insufficient instruction level parallelism or insufficient machine level parallelism.

With respect to insufficient instruction level parallelism, subsequent dependencies on values computed in one iteration serve to limit how far the initiation interval can be reduced. In other words, the initiation interval cannot be so short that a value calculated in one iteration is not completely calculated by the time it is needed in the subsequent iteration. This is an example of instruction level parallelism limitations.

With respect to insufficient machine level parallelism, the initiation interval may be constrained by insufficient resources. In other words, if there are insufficient processor cycles in an initiation interval to provide the resources needed to complete an iteration, then the initiation interval is limited due to insufficient machine parallelism.

Generally the minimum initiation interval is determined by the larger of 1) the minimum number of cycles required to resolve dependencies in one iteration so that the values are ready when needed in a subsequent iteration, and 2) the minimum number of cycles required to provide for the resource utilization of all the instructions in an iteration.

At step 320, the computer implemented software pipelining method initializes the variable PRIOR_LENGTH to ensure at least one pass through the loop represented by steps 330–370. This might be accomplished by setting PRIOR_LENGTH to some arbitrarily large value to ensure that the first time through step 350 PRIOR_LENGTH will be less than or equal to SL.

At step 330, the current state of the loop being pipelined, L, is recorded. Given that the method iteratively performs reordering of instructions, a subsequent iteration may produce a worse initiation interval. A copy of L is stored as L' to ensure that a scheduling from the previous iteration can be retrieved if loop L as previously scheduled has a better initiation interval than the current instruction schedule of L.

Instruction Level Parallelism Transformations

At step 335, instruction level parallelism transformations are performed on program loop L. In one embodiment constant combining, operation combining, software register renaming, and the RHS/LHS transformation some of the methods used to help increase the instruction level parallelism of the program loop L.

Procedural and resource dependencies operate to reduce the instruction level parallelism of the program loop, L. This in turn serves as an impediment to further reordering of instructions from other iterations of program loop L. In order to improve the instruction level parallelism of program loop L, instruction level parallelism transformations are performed during each iteration of the software pipelining algorithm in order to help maximize the instruction level parallelism of the program loop at each stage. This in turn tends to make more instructions available for reordering because their dependencies have been eliminated. Thus the integration of instruction level parallelism transformations into the software pipelining algorithm helps to ensure maximal instruction parallelism during each iteration of the software pipelining algorithm and as a result helps to produce a maximally (i.e., optimally) software pipelined program loop (i.e., further pipelining will not improve the execution throughput of the program loop L).

Constant and Operation Combining

Flow dependencies may be eliminated through the use of constant combining and operation combining. For example, consider a sequence of code including the following instructions:

r0←r0+8;

r1←memory[r0];

Before constant combining, this sequence requires two addition operations, each of which adds a different constant to register 0 (an implicit 0 is added to r0 in the memory reference). After constant combining, the sequence might be as follows:

r1←memory[r0+8];

r0←r0+8;

Now the two constants have been combined into one constant such that only one addition operation must be performed. Note also that constant combining has removed flow dependency in this code sequence. In other words, the second instruction is not dependent upon the first instruction.

Applying constant combining to an earlier example permits reducing the flow dependence between the first and second program loop iterations. Thus the application of constant combining permits the following instruction sequence (from an earlier example):

| L10: | | |
|---|---|---|
| r2 <- r2 + r1; | cycle 1 | I1 |
| r0 <- r0 + 8; | cycle 1 | I1 |
| r1 <- memory[r0]; | cycle 2 | I2 |
| branch to L10 if (r0 < r3); | cycle 2 | | to be converted to

| L10: | |
|---|---|
| r2 <- r2 + r1; | cycle 1 |
| r1 <- memory[r0 + 8]; | cycle 1 |
| r0 <- r0 + 8; | cycle 1 |
| branch to L10 if (r0 < r3); | cycle 2 |

This new code schedule requires 3 cycles per iteration of the program loop in an in-order execution machine.

Operation combining is similar to constant combining except that register values are combined instead of constants.

In one embodiment, each pair of instructions within each basic block of the program loop is considered as a candidate for constant and operation combining. In an alternative embodiment, each pair of instructions within the program loop is considered as a candidate for constant and operation combining.

Software Register Renaming

Software based register renaming helps to eliminate anti-dependencies and output dependencies in much the same way as hardware based dynamic register renaming. Software based register renaming, however, is performed by the compiler. The compiler renames the destination registers of instructions that are causing the false dependencies. The source register in subsequent instructions that depend on the value stored in the renamed register are correspondingly renamed. One "pseudo-C" algorithm for accomplishing the register renaming function is provided in Appendix II.

LHS/RHS Split Transformation

The LHS/RHS split transformation is another method used to help eliminate antidependencies and output dependencies that may be introduced when an instruction is moved above a branch. Antidependencies or output dependencies that result from moving an instruction above a branch must be removed in order to ensure that the data flow occurs as intended.

For example, suppose that before any reordering is performed, the instruction sequence is as follows:

```
r0 <- memory[r1];
if (r2)
    r0 <- memory[r3];
r1 <- memory[r0];
```

Suppose that the branch condition is true. Before any transformation, the r1←memory[r0] instruction cannot be executed until the r0←memory[r3] instruction completes. Ignoring this dependency, a scheduling algorithm might generate the following code:

```
r0 <- memory[r1];
r0 <- memory[r3];
if(r2);
r1 <- memory[r0];
```

If the branch condition is true, r0 will be correct. If, however, the branch condition is false, register r0 is not storing the proper value at the time the r1←memory[r0] instruction executes. After the LHS/RHS split transformation, however, the instruction sequence now appears as

```
r0 <- memory[r1];
r4 <- memory[r3];
if (r2)
    r0 <- r4;
r1 <- memory[r0];
```

The LHS/RHS split transformation permits the r2←memory[r2] to be scheduled to hide its long execution latency. Thus the r1←memory[r0] only needs to wait one cycle so that the r0←r4 instruction can complete.

A pseudo-C implementation of the LHS/RHS splitting transformation is provided in Appendix III.

Single Iteration Scheduling

At step 340, global scheduling is applied to instructions in the program loop body. In one embodiment, the scheduler attempts to minimize the length of the code schedule by moving critical instructions to the entry basic block of the program loop. The entry basic block is the basic block associated with the control flow entry for the program loop.

Global code scheduling algorithms are well known in the art. In one embodiment, the global code scheduling algorithms move instructions across basic block boundaries, but only in a manner which is independent of the outcome of the branch. In another embodiment, the global code scheduling algorithm converts sequences of basic blocks into larger basic blocks. This might include using hierarchical reduction to convert branching structures into non-branching structures in order to generate larger basic blocks. Thus the software pipelining method iteratively integrates instruction level parallelism transformations with global code scheduling to help achieve as short of an initiation interval as possible.

In one embodiment, the global code scheduler might be limited to block scheduling. Block scheduling is a special case of global scheduling in which the global code scheduling does not include moving instructions across any block boundaries. A block scheduling technique is used on each block within the program loop (hence "global scheduling"), but instructions are not moved across block boundaries. Thus the software pipelining method iteratively integrates instruction level parallelism transformations with basic block scheduling to help achieve as short of an initiation interval as possible.

In step 345, the length of the code schedule after single iteration scheduling is determined. The length of the code schedule for a single iteration of the program loop serves as an upper bound for the initiation interval of the program loop.

For any given iteration of the software pipelining method, if the current single iteration schedule length exceeds the single iteration schedule length calculated in the previous cycle, then the iterative scheduling process ends. The program loop as scheduled in the previous cycle is used because further software pipelining would actually increase the initiation interval of the program loop.

Step 350 determines whether the single iteration schedule length from the previous cycle (represented by PRIOR_LENGTH) is greater than or equal to the current single iteration schedule length (i.e., SL). If not, then step 380 ensures that the previous version of program loop L is used because the resultant schedule is not an improvement over the previous schedule generated.

Step 355 determines whether the resultant schedule is optimal (i.e., the initiation interval is equal to the minimal initiation interval). If the minimum initiation interval has been reached, then no further scheduling can improve upon the current schedule of instructions and thus the iterative scheduling process stops.

If, however, the initiation interval of program loop L as currently scheduled (i.e., SL) is greater than the minimum initiation interval, then further scheduling may result in a lower initiation interval. In this case, the method proceeds with steps 360–370 to produce another version of program loop L through rescheduling.

In step 360, variable PRIOR_LENGTH is set to the initiation interval of program loop L as currently scheduled (i.e., PRIOR_LENGTH=SL). In other words, even though the minimum initiation interval has not yet been reached, this version of program loop L has a lower initiation interval than previously scheduled versions of program loop L. Therefore, the initiation interval of this version of program loop L will be used for comparison with future versions of program loop L.

Selection and Percolation of Instructions

In order to improve the code schedule, instructions are moved ("percolated") to previous iterations of the loop. This permits the instructions to be executed earlier, thus hiding latencies. In order to maintain simplicity of the method, only instructions within the entry basic block of program loop L are considered as candidates for percolation. The following types of instructions within the entry basic block, however, are not candidates for percolation:

1. Branch instructions
2. Store instructions
3. Any instruction executed in the last M clocks of the single iteration schedule where M is the greater of the longest instruction latency in the loop or the minimum initiation interval.

Candidate instructions within the entry basic block of program loop L will be percolated to a previous iteration, if possible, in an attempt to minimize the initiation interval by hiding the latencies of the percolated instructions.

Iterations

The process of transforming, scheduling, and percolating instructions continues until either 1) there is no improvement in the initiation interval, or 2) the minimum initiation interval is reached. Thus through iterative techniques this method attempts to reduce the initiation interval of program loop L to the lower bound minimum initiation interval until constraints due to insufficient machine or instruction level parallelism limit further reductions.

Unlike the prior art technique of loop unrolling, this software pipelining method is not constrained to scheduling program loop instructions from adjacent program loop iterations. Thus the resulting code permits overlapping of widely separated (i.e., substantially nonadjacent) iterations of the program loop in a hardware pipelined processor.

Loop Prologue and Loop Epilogue

Because software pipelining percolates instructions from different iterations of the program loop, the software pipelined loop may contain instructions from different iterations of the original program loop. This means that before the loop begins executing, the loop pipeline must be initialized or "filled" by executing the earlier iterations of the instructions. These instructions are placed into a loop prologue which is executed before the software pipelined loop begins. The loop prologue is generated at step 385.

When the final iteration is detected, some instructions may be in earlier iterations. These instructions must be executed in order to complete any unfinished iterations. The scheduling method accomplished this pipeline "draining" process by placing such instructions into a loop epilogue. The loop epilogue is executed once after the program loop terminates. The loop epilogue is generated at step 390.

Thus the final product will be a sequence of code including a loop prologue, a software pipelined loop, and a loop epilogue.

Implementation

The method of software pipelining presented above may be combined with other processor architectural designs in order to enhance processor performance. For example, complex instruction set computer (CISC) architectures attempt to reduce the number of instructions required to execute the program. Reduced instruction set computer (RISC) architectures attempt to improve performance by reducing the number of cycles taken to execute an instruction. This method of software pipelining may be used to produce code for execution on scalar, superscalar, CISC, RISC, pipelined, or superpipelined processor architectures in order to improve processor performance and execution throughput of program loops having a single control flow entry point and one or more control flow exit points.

In one embodiment, the software pipelining method can be implemented as part of a compiler. Thus the compiler produces software-pipelined code for execution on the processor.

In another embodiment, the software pipelining method is implemented in a post-pass scheduler. A post-pass scheduler works independently of the compiler. In a post-pass scheduler, the software pipelining algorithm is typically performed on an object code representation of the program that was produced by a compiler.

In the preceding detailed description, the invention is described with reference to specific exemplary embodiments thereof. Various modifications and changes may be made without departing from the broader spirit and scope of the invention as set forth in the claims. The specification and drawings are, accordingly, to be regarded in an illustrative rather than a restrictive sense.

APPENDIX I

A "pseudo-C" representation of the software for computer implementation of the software pipelining algorithm is presented below.

```
Calculate MII;              (Minimum Initiation Interval)
prior_length = INFINITY;    (Length of previous schedule)
do {
    L' = L;                 (Record original state of loop L)
    Apply ILP-Transformations on loop L;
    Apply Single-Iteration Scheduling on loop L;
    SL = length of the single iteration schedule;
    if (prior_length <= SL) {
    L = L';
    continue = FALSE;
    }
    else if ((prior_length > SL) and (SL > MII)) {
        prior_length = SL;
        continue = TRUE;
        Apply Select-Instructions-To-Be-Percolated(L);
        Apply Percolate-Instructions(L);
    }else{
        continue = FALSE;
    }
} while (continue)
Generate loop prologue and epilogue;
```

APPENDIX II

```
The following "pseudo C" code offers one approach
to software based register renaming to help remove antidependencies
and output dependencies.
    for (each antidependency and output dependence arc A){
        let p1 = A.src;
        let p2 = A.dst;
        if ((p2 is not flow dependent on any instruction) and
            (p2 is critical) and
            (p2.destination is live only within current loop
                iteration) and
            (there is a register available for renaming)){
            rename p2.destination;
            apply copy propagation to all uses of old
                p2.destination;
        }
    }
```

An "arc" or "edge" represents an identified dependency link between two instructions. Arc A identifies a dependency between a source instruction and a destination instruction. Variable p1 is assigned the source instruction of arc A. Variable p2 is assigned the destination instruction of arc A. The destination instruction is dependent upon the source instruction.

In order to apply register renaming, several criteria should be met. First, the program ensures that the second instruction is not flow dependent on any instruction. Next, the second instruction is examined to ensure that it is on the critical completion path. Next, if the dependent resource identified within the destination instruction is used before it is modified, the resource is determined to be "live." Therefore, the destination operand (i.e., p2.destination) is examined to ensure that it is live only in the current program loop iteration (if at all). Finally, the program must ensure that a register is available to implement register renaming.

If (1) p2 is not flow dependent on any instruction, and (2) p2 is in the critical path, and (3) p2.destination is live only within the current program loop iteration, and (4) a register is available for renaming, then the p2.destination register is renamed. The register renaming is applied to all subsequent uses of the register identified by p2.destination to ensure that the renaming of the register is properly propagated.

APPENDIX III

The following "pseudo-C" code is provided as an example for implementing the LHS/RHS transformation.

```
for (each antidependency and output dependent arc A){
    let p1 = A.src;
    let p2 = A.dst;
    if (p1 is not a branch)
        continue;
    if p2.destination is not in LIVE_OUT(p1))
        continue;
    if ((p2 is not flow dependent on any instruction in the same
        basic block as where p2 resides) and
        (p2 is critical) and
        (p2.destination is live only within current loop
            iteration) and
        (there is a register for renaming)) {
        rename p2.destination;
        apply copy propagation to all uses of old
            p2.destination;
    }
}
```

Most of the terminology is similar to that used in Appendix II. LIVE_OUT represents a set of instructions dependent upon the instruction identified by variable p1.

What is claimed is:

1. A method of scheduling a sequence of instructions within a program loop, comprising the steps of:
    a) computing a minimum initiation interval of a program loop having a single control flow entry and at least one control flow exit;
    b) applying instruction level parallelism transformations on the program loop;
    c) applying single iteration scheduling on the program loop;
    d) percolating selected instructions to a prior iteration of the program loop to generate a new instruction order for the program loop;
    e) repeating steps b)–d) as long as a previous single iteration length of the program loop is greater than or equal to a current single iteration schedule length of the program loop and the current single iteration schedule length exceeds the minimum initiation interval.

2. The method of claim 1 further comprising the steps of:
    f) generating a program loop prologue; and
    g) generating a program loop epilogue.

3. The method of claim 1 wherein the instruction level parallelism transformations include constant combining.

4. The method of claim 1 wherein the instruction level parallelism transformations include operation combining.

5. The method of claim 1 wherein the instruction level parallelism transformations include software based register renaming.

6. The method of claim 1 wherein the instruction level parallelism transformations include an LHS/RHS transformation.

7. A method of scheduling a sequence of instructions within a program loop, comprising the steps of:
    a) computing a minimum initiation interval of a program loop having a single control flow entry and at least one control flow exit;
    b) saving the program loop as a recorded program loop;
    c) applying instruction level parallelism transformations on the program loop to produce a revised program loop;
    d) applying single iteration scheduling on the revised program loop;
    e) determining a single iteration schedule length, SL, of the revised program loop;
    f) restoring the recorded program loop as the revised program loop, if a previous length is not greater than SL;
    g) performing the following steps if the previous length is greater than or equal to SL and SL is greater than the minimum initiation interval:
        i) equating the previous length to SL; and
        ii) percolating selected instructions of the revised program loop to a prior iteration of the revised program loop;
    h) repeating steps b)–g) as long as the previous length is greater than or equal to SL and SL is greater than the minimum initiation interval;
    i) generating a loop prologue for the revised program loop; and
    j) generating a loop epilogue for the revised program loop.

8. The method of claim 7 wherein the instruction level parallelism transformations include constant combining.

9. The method of claim 7 wherein the instruction level parallelism transformations include operation combining.

10. The method of claim 7 wherein the instruction level parallelism transformations include software based register renaming.

11. The method of claim 7 wherein the instruction level parallelism transformations include an LHS/RHS transformation.

12. A method of scheduling instructions in a program loop, comprising the steps of:
    a) computing a minimum initiation interval of a current loop having a single control flow entry and at least one control flow exit;
    b) applying instruction level parallelism transformations on the current loop to generate a transformed loop, wherein the current loop becomes a previous loop and the transformed loop becomes the current loop;
    c) applying single iteration scheduling on the current loop;
    d) percolating selected instructions of the current loop to a prior iteration of the current loop to generate a new instruction order for the current loop; and
    e) repeating steps b)–d) as long as a previous loop single iteration schedule length is greater than or equal to a current loop single iteration schedule length and the current loop single iteration schedule length exceeds the minimum iteration interval.

13. The method of claim 12 further comprising the step of:
    f) selecting the previous loop as the current loop, if the current loop single iteration schedule length exceeds the previous loop single iteration schedule length.

14. The method of claim 13 further comprising the steps of:

g) generating a current loop prologue; and h) generating a current loop epilogue.

15. The method of claim 12 wherein the instruction level parallelism transformations include constant combining.

16. The method of claim 12 wherein the instruction level parallelism transformations include operation combining.

17. The method of claim 12 wherein the instruction level parallelism transformations include software based register renaming.

18. The method of claim 12 wherein the instruction level parallelism transformations include an LHS/RHS transformation.

* * * * *